Nov. 14, 1961   I. J. WINTERFELDT   3,008,404
MACHINE FOR FRYING DOUGHNUTS AND THE LIKE
Filed Dec. 28, 1956   3 Sheets-Sheet 1
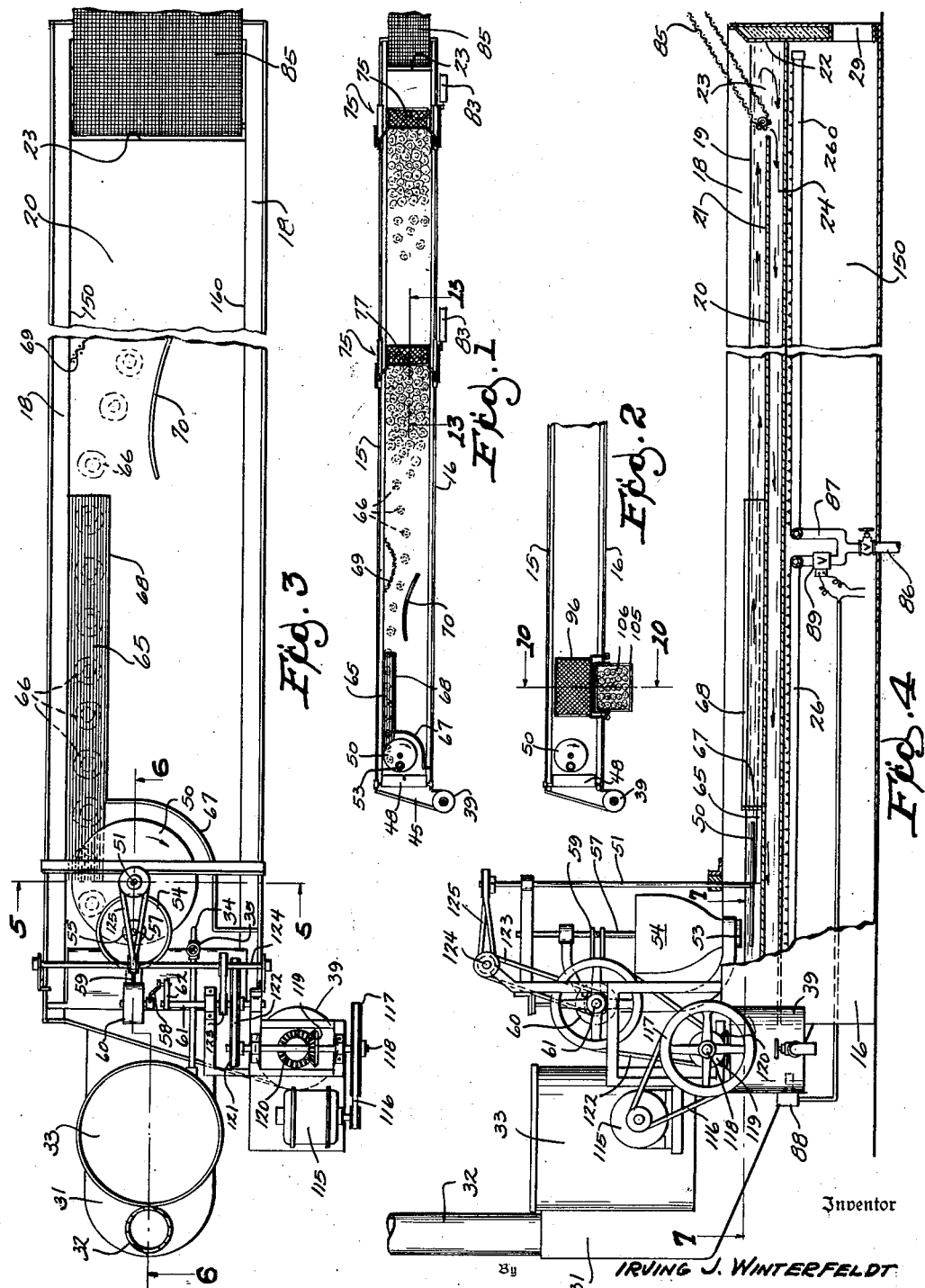
Inventor
IRVING J. WINTERFELDT
By Wheeler, Wheeler & Wheeler
Attorneys

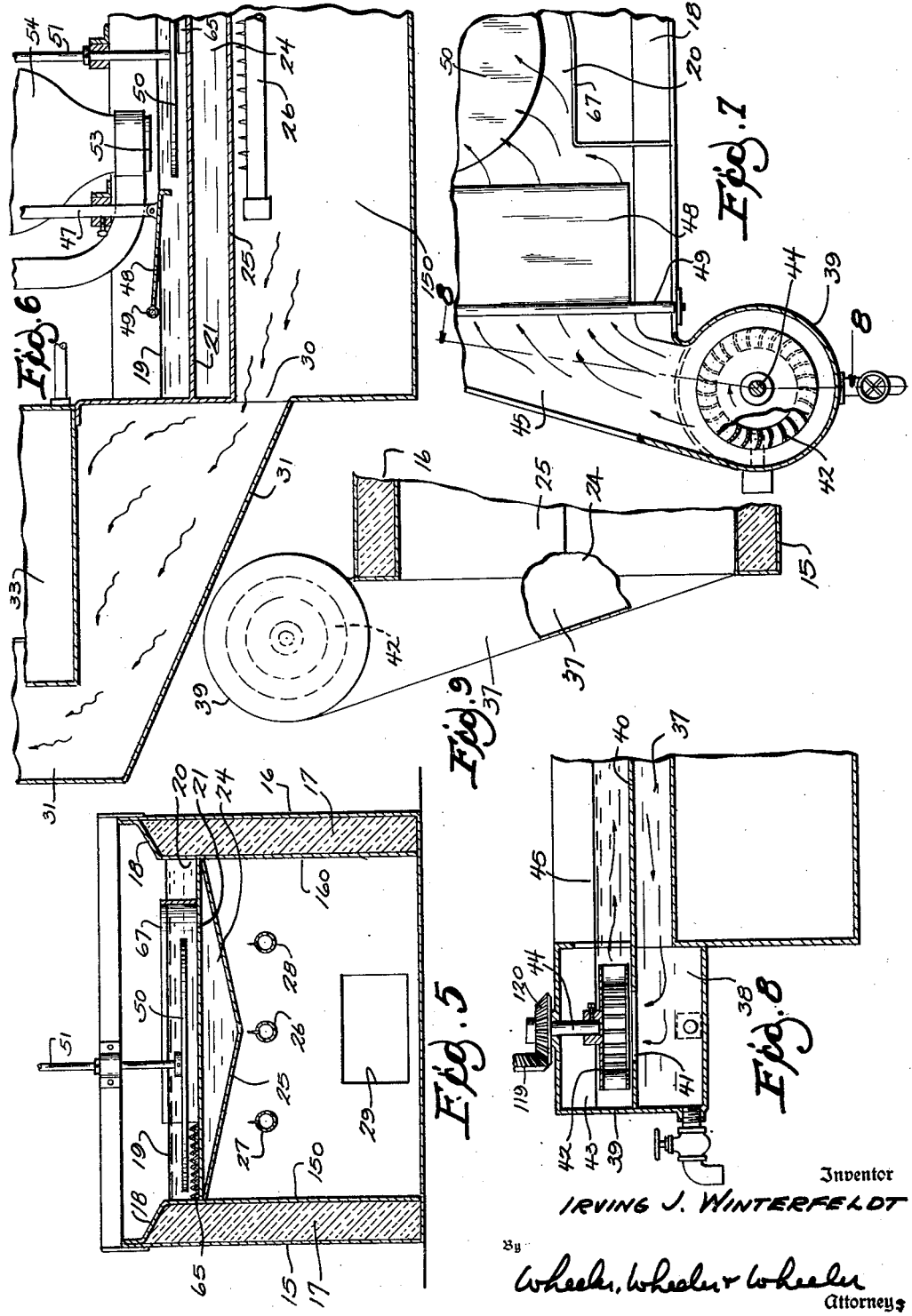

Nov. 14, 1961  I. J. WINTERFELDT  3,008,404
MACHINE FOR FRYING DOUGHNUTS AND THE LIKE
Filed Dec. 28, 1956  3 Sheets-Sheet 3
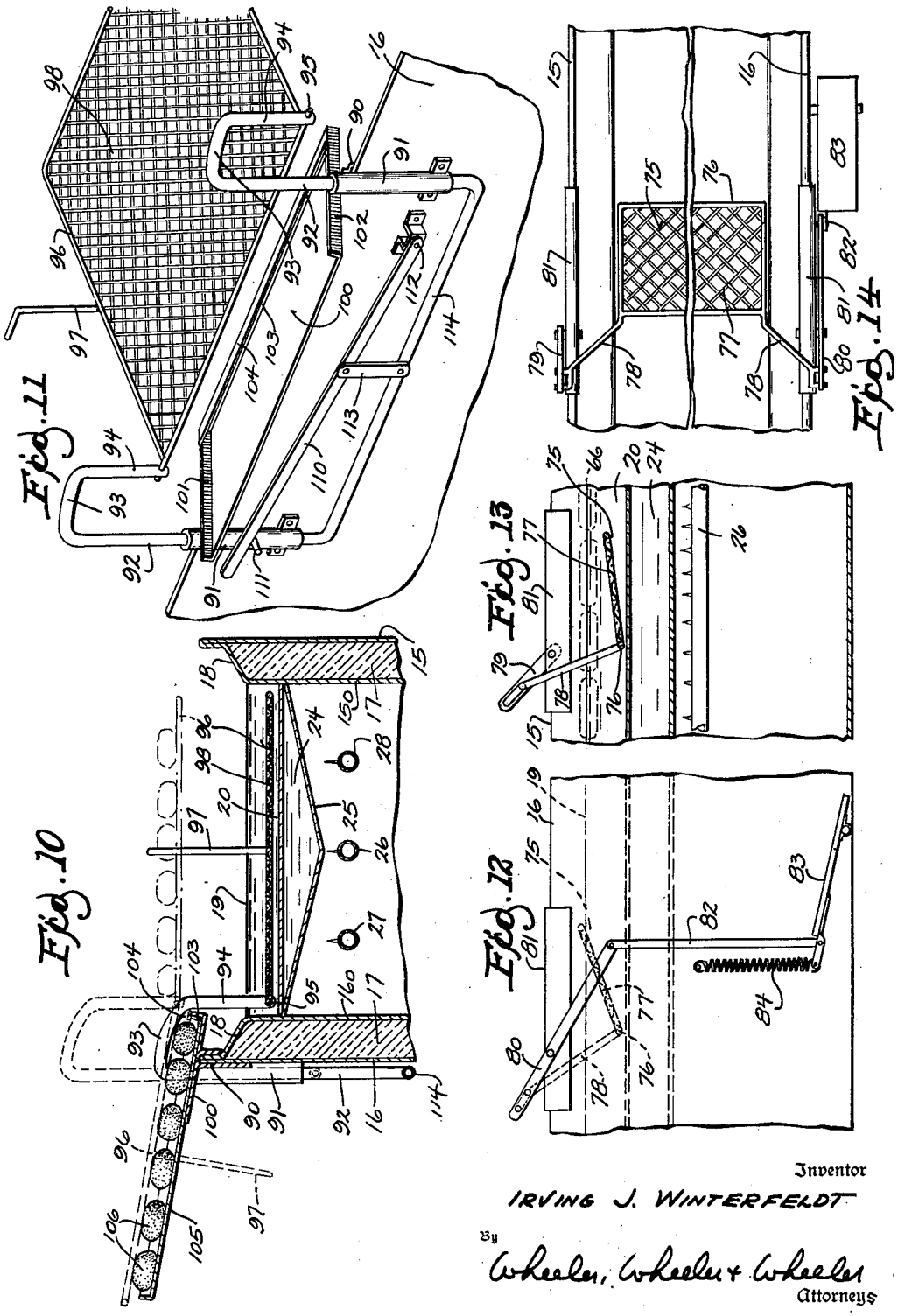
Inventor
IRVING J. WINTERFELDT
By
Wheeler, Wheeler & Wheeler
Attorneys

United States Patent Office

3,008,404
Patented Nov. 14, 1961

3,008,404
MACHINE FOR FRYING DOUGHNUTS AND THE LIKE
Irving J. Winterfeldt, 1537 Shermer Road, Northbrook, Ill.
Filed Dec. 28, 1956, Ser. No. 631,356
7 Claims. (Cl. 99—406)

This invention relates to a machine for frying doughnuts and the like in a circulating current of hot fat. Cross reference is made to my co-pending application, Serial No. 211,420, filed February 16, 1951, now abandoned.

The invention is particularly concerned with a machine in which the return flow of the current of fat which propels and fries the doughnuts is conducted through a return pipe means which immediately underlies the outgoing flow whereby excess heat applied to the fat in the return pipe means passes through the bottom of the frying channel, the arrangement being such as not only to be economical of floor space, but, particularly, to minimize the exposure of the fat to the air; to effect heat transfer between the outflow and returning currents; to accelerate return flow by reducing the cross sectional capacity of the conduit provided therefor, thus also minimizing the total amount of fat required for the operation; and facilitating the application of direct heat to the return circuit only, so that crumbs of the food products which are being fried do not become scorched, and the fat is protected from oxidation, the heat being efficiently used and thoroughly distributed before the food products are dumped into the fat for frying.

The accelerated return flow is very important as a means of accurately controlling the temperature of the fat without the overheating thereof. I have discovered that if the fat is overheated, it breaks down, with the result that the fat is absorbed into the dough at the rate of six ounces to the dozen doughnuts, whereas, if the fat is maintained just below the temperature of at which it breaks down, only one and one-half ounces of fat is absorbed by a dozen doughnuts.

Another objective is to make the machine adaptable for the frying of both raised doughnuts and cake-type doughnuts, the latter being deposited mechanically into the fat and the former being preshaped and deposited by manipulation of a foraminous screen. Where the cake-type doughnuts are formed and dropped into the fat by long known mechanisms for the purpose, I provide as an important feature of the present machine a disk rotatable immediately below the surface of the fat and onto which the rings of dough fall when released from the hopper. As is well known, the freshly deposited rings of dough have a specific gravity greater than that of the grease and settle through the hot fat. The rotatable plate which receives them mechanically imparts to them a movement in the direction of flow of the current of fat and makes it possible to operate the dough cutting machine with tremendous rapidity without any possibility that any newly cut ring of dough will fall on top of a previously deposited blank. From the rotating disk, the blanks of dough are discharged tangentially in the direction of flow of the current of fat and rise therein, in due course, and are thereupon distributed throughout the width of the channel in which such flow occurs.

The invention further contemplates the use of weirs or screens through which the current of fat may flow, while the doughnuts are arrested. It is found that this produces a better product by permitting relative movement of the current with respect to the doughnuts, and it saves space because the doughnuts continue to fry until thoroughly cooked in a space of time in which, had they continued to travel with the current, they would have progressed for a considerable distance of travel. In addition, the use of these weirs under manual control permits the operator to release any desired number of doughnuts for further advance to be turned or removed as the convenience and skill of the operator may direct.

The invention is further concerned with the means by which raised doughnuts and other similar food products may be lowered into the current of fat when not discharged mechanically therein.

In the drawings:

FIG. 1 is a diagrammatic plan view on a small scale of a doughnut machine embodying the invention as it appears when set up for making cake-type doughnuts.

FIG. 2 is a fragmentary plan view of the machine shown in FIG. 1 as it appears when set up for frying raised doughnuts and other pre-formed workpieces.

FIG. 3 is an enlarged plan view of the actual machine, with its central portions broken away for convenience of illustration.

FIG. 4 is a side elevation of the machine shown in FIG. 3 with portions broken away to a longitudinal section.

FIG. 5 is a view in cross section taken on line 5—5 of FIG. 3.

FIG. 6 is a view in cross section on the line 6—6 of FIG. 3.

FIG. 7 is a view taken in cross section on the line 7—7 of FIG. 4.

FIG. 8 is a view taken in section on the line 8—8 of FIG. 7.

FIG. 9 is an inverted fragmentary plan view of the end of the machine shown in FIGS. 7 and 8.

FIG. 10 is a view taken in section on an enlarged scale on the line 10—10 of FIG. 2.

FIG. 11 is a view in perspective showing in different relative positions the parts illustrated in FIG. 10.

FIG. 12 is a detail view in side elevation of the outside of the machine opposite one of the weirs for controlling the movement of workpieces with the current of fat.

FIG. 13 is a view taken in longitudinal section on the line 13—13 of FIG. 1 showing in different position the parts illustrated in dotted lines in FIG. 12.

FIG. 14 is a plan view of the parts shown in FIGS. 12 and 13.

The machine is assembled upon and between parallel side walls 15 and 16 which, as shown in FIGS. 5 and 10, are double walls containing thick layers of insulation at 17. The inner walls 150 and 160 are flanged outwardly over the insulation at 18, immediately above the level of the fat at 19.

The channel 20 in which the frying is done is relatively very shallow, being formed at its sides by the inner walls 150 and 160 and at its bottom by the horizontal partition 21 extending transversely of the machine between such side walls. As best shown in FIG. 4, the partition 21 terminates short of the end wall 22, leaving an opening at 23 through which the current of hot fat can circulate downwardly into the return channel 24, as indicated by the arrow in FIG. 4.

The return pipe means or channel 24 is preferably of materially less cross sectional capacity than the outflowing channel 20 in which the frying is done. Thereby the circulating flow through the return pipe means is made much more rapid than flow through the frying channel. To provide return pipe means having a minimum cross section, I have found it convenient to employ the bottom wall 25 which, as best shown in FIGS. 5 and 10, has its upper margins connected with, or substantially at the level of, the sides of partition 21. From the partition 21, the bottom wall diverges downwardly to a low point which may be immediately above the central burner 26. I may use three burner tubes 26, 27 and 28 located in the space beneath the bottom wall 25 and between the side walls 15 and 16. This space is substantially closed except that I may provide one or more draft openings at 29 for the admission of air to support combustion and I desirably provide one or more vent openings at 30 to enable the products of combustion to escape through the jacket 31 to the flue 32. Jacket 31 at least partially encloses a pre-heating tank 33 in which replacement fat is stored and heated to be delivered into the apparatus through the pipe 34, subject to the control of valve 35 (FIG. 3) as needed.

At this end of the machine, I provide a fat circulator. The inverted plan view in FIG. 9 and the section in FIG. 8 show a manifold 37 leading from the return flow passage 24 to a sump chamber 38 in the bottom of the pump housing 39. The top of the manifold is formed by a partition 40 which represents an extension of the partition 21 in the operating portions of the machine. This partition has an aperture at 41 through which the returning current of hot fat flows upwardly into the inlet of the annular centrifugal pump runner 42 in the chamber 43 above partition 40. This runner is rotated by a shaft 44 at sufficient speed to impel the fat outwardly through its generally radial vanes shown in FIG. 7, discharge from the pump chamber 43 occurring through manifold passage 45 above partition 40, whereby it is led back to channel 20 as shown in FIG. 7. With the pump in operation at a constant rate, the operator can control the velocity of flow of the current by using the valve adjusting rod 47 (FIG. 6) to manipulate the baffle or damper 48, the latter being pivoted on rock shaft 49 as shown in FIGS. 6 and 7.

At the beginning of the frying channel 20, and immediately beyond the valve plate or baffle 48, is the rotatable disk 50 which is about midway between the fat level 19 and the partition wall 21 at the bottom of channel 20. The disk is relatively thin and is preferably rotated by its shaft 51 at a peripheral speed somewhat in excess of the velocity of the current of fat.

Immediately above the fat level 19 is the discharge end 53 of the hopper 54 of a conventional device for forming dough rings or blanks for fried cakes. Since the machine is conventional, it is not illustrated in detail, but I have shown in FIG. 3 the valve 55 at the bottom of the hopper which, by opening, permits an annular flow of batter or dough and, in its closing movement, severs the outflowing batter to form a ring which thereupon drops into the fat. The vertical movement of the valve is effected by means of a reciprocating valve stem 57 oscillated by a forked lever 59 which, in turn, is actuated through the crank case 60 by means of a crank 58 shown in FIG. 3. The machine was designed for manual operation but has been converted to power operation by the provision on shaft 61 of an arm 62 which engages the crank 58 for the rotation thereof.

Laid loosely on the partition wall 21 beneath the rotatable disk 50 is a guide strip of corrugated metal at 65 upon which the machine-formed fried cake blanks receive such support as they need during the period while they are heavier than the fat. The corrugations extend longitudinally of the strip to permit the fried cake blanks to slide readily in the direction of flow of the fat current, while supporting the blanks in a position such that the fat can have access to their lower surfaces. As aforesaid, the rising of the batter during its initial heating so increases the size of the blank, and decreases its relative specific gravity, that it soon floats to the surface of the current, free of contact with the guide 65.

The successive blanks deposited from the hopper 54 upon the opening and closing of the valve 56 have motion imparted to them by the rotating disk 50 on which they fall. The disk moves each one in turn from the position in which it was dropped from the hopper to make room for the dropping of a successive blank. The several blanks are discharged centrifugally from the disk 50 to move along the guide as indicated at 66 in FIG. 3. In the course of such movement, they are immediately adjacent the wall 150. There is a tendency of the disk 50 to direct the major current flow toward such wall and to produce an eddy or back flow along the wall 160 toward the receiving end of the channel. To preclude the doughnuts from being held in any such eddy, I desirably provide a baffle which has an arcuate portion at 67 around the disk 50 and a rectilinear portion 68 at the side of the guide 65.

As soon as the doughnuts float to the surface, it is desirable to distribute them over the entire width of channel 20 and to this end I use a foraminous arcuate deflector 69 against the wall 15 and an oppositely convex upright plate 70 in midchannel as best shown in FIG. 1. This combination of elements has been found to cause the single file line of fried cakes to fan out across the channel to distribute themselves across the entire width thereof. The parts 65, 67, 69 and 70 are all entirely free of physical connection with the machine so that they can readily be lifted out of the channel when their use is not required.

At some point of the channel remote from the point where the articles are deposited therein, I desirably provide at least one, and preferably two, weirs 75 as best shown in FIGS. 3, 12, 13 and 14. Each of these comprises a frame 76 across which extends a screen 77 which may be made of very coarse screen-cloth or expanded metal. Each weir has supporting arms 78 connected respectively to levers 79 and 80 which are pivoted on the saddles 81 mounted on the side walls 15 and 16. The lever 80 is extended downwardly beyond its pivot and has a link 82 whereby it is connected with the pedal 83 supported by a spring 84. By stepping on the treadle, the operator can depress the weir 75 to lower it from the position shown in FIG. 12 to the position shown in FIG. 13, in which latter position it is well below the surface 19 of the fat, so that the workpieces 66 readily float thereover as indicated in FIG. 13. While it is expedient to have the frying workpieces propelled by the fat, it is also desirable to use a minimum amount of fat and to have a minimum portion of the fat surface exposed to the air for oxidation. It is also desirable that the heat be applied to the fat only during the return flow thereof. If the flow were slow, the fat temperature could not be properly controlled. In order that the flow may be rapid, without having much surface exposed, or requiring undue floor space for the machine, it is very important to the operator to be able to hold the workpieces stationary during at least a part of the period required for cooking. It is further believed that a better product results where the workpieces are in immediate proximity to each other as they are when either one of the weirs 75 interrupts flow and permits the workpieces to accumulate.

The first of the weirs 75 is ordinarily located just before the point at which the doughnuts are turned. While the turning may be done in any desired manner, it is performed manually in the present machine. The operator presses the treadle to release the workpieces as fast as he can conveniently turn them. Thereupon they float to the second weir with the current and when they are sufficiently browned, they are removed from the fat either manually or by the conveyor shown in FIGS. 3 and 4 at 85, this conveyor being desirably located immediately beyond the end of the partition 21 which defines the bottom surface of the frying channel 20.

It will be observed in FIG. 4 that the gas supply line 86 which leads to the burners 26, 27 and 28 is branched at 87 to serve not only the burners 26, 27 and 28 at the input end of the machine, but also the corresponding burners 260, etc. at the fried cake delivery end of the machine. I have found that adequate temperature control of the fat is achieved if only the one set of burners is cut off and on by the thermostat 88 which opens and closes the valve 89 as indicated diagrammatically in FIG. 4. The thermostat is desirably located in the sump.

For cooking products other than fried cakes, this including any other workpieces of any character suitable for deep fat frying, I may desirably use the mechanisms best illustrated in FIGS. 2, 10 and 11. The parts 65, 67, 68, 69 and 70 are all removed and, as a means of placing the workpieces into the channel 20, I mount on the side wall 16 a pair of saddle elements 90 which support the sleeves 91 in which the bars 92 are reciprocable. These bars have overhanging portions at 93 from which depend the arms 94 in positions to be lowered into the channel, as shown in FIG. 10, or raised therefrom, as shown in dotted lines in FIG. 10, and in full lines in FIG. 11. Pivoted to the respective arms 94 is a rock shaft 95 carrying a frame 96 having a handle at 97 for its manipulation. The frame carries a coarsely reticulated screen 98 which may be screen-cloth or expanded metal.

The sleeve 91 also supports, desirably at an angle as shown in FIGS. 10 and 11, a tray carrier plate 100 which is provided with marginal flanges at 101, 102 and 103 and an overhanging flange at 104. A tray 105 loaded with workpieces 106 is placed on the support 100 and caught beneath the overhanging flange 104. Thereupon, with the bars 92 in their raised position as shown in full lines in FIG. 11 and in dotted lines in FIG. 10, the handle 97 is used to oscillate the frame 96 pivotally to a position on top of the workpieces as shown in dotted lines in FIG. 10. The operator thereupon manipulates both the handle 97 and the tray 105 to oscillate the frame 96 back over the channel, the tray 105 being carried with it to hold the workpieces to the screen-cloth 98. The operator then releases the hand lever 110 from the detent fingers 111 upon which it is loosely caught, as shown in FIG. 11, and, having removed the tray, lowers the lever 110 about its fulcrum 112 to transmit motion to link 113 to the cross bar 114 which connects the lower ends of bars 92. Thereby the bars are lowered from the position of FIG. 11 to the position in which the parts are shown in full lines in FIG. 10, thus moving to the bottom of channel 20 the frame 96 upon which the workpieces are now supported. If the workpieces are lighter than the fat, they will immediately float up into the current and be moved thereby along the channel. If they are heavier than the fat at the time of deposit, they will remain on the screening 98 until they become sufficiently light to float. As soon as the workpieces float clear of the frame 96, the frame may be raised by means of lever 110 and the handle 97 and again inverted over the workpieces on a fresh tray.

The operating connections are as follows: The motor 115 is connected by belt 116 with pulley 117 on shaft 118. This shaft carries a bevel gear 119 meshing with the gear 120, carried by the pump shaft 44.

Shaft 118 continues across the pump housing 39 and carries the pulley 121. Through belt 122, this drives the shaft 61 for actuating arm 58 of the dough forming device. Shaft 61, in turn, is connected by belt 123 with jack shaft 124 which drives shaft 51 through belt 125 to actuate the disk 50.

As compared with other frying machines, the present device achieves remarkable speed of production with remarkable economies in the use of fat. Other commercial machines require 1200 pounds of fat to produce 600 dozen fried workpieces per hour, whereas the present machine will produce 1000 dozen fried workpieces per hour with only 400 pounds of fat. Where the workpieces are batter rings for fried cakes, a considerable acceleration is achieved in the operation of the forming device.

In ordinary usage, the forming device herein referred to is only operated to cut 10 or 12 batter rings per minute. By moving the freshly cut rings of batter out from under the machine on the disk above disclosed, I am able to cut 9 dozen blanks per minute. Applying this output to the capacity of the machine as a whole, it will be evident that while I have only disclosed one cutter, the machine as illustrated is capable of frying as many fried cakes as can be produced by two such cutters operating even at this tremendously increased output.

There is very little waste heat in the use of my apparatus and the room in which it is operated does not become nearly so hot in the summertime as in the use of conventional machines. This is only partly due to the heavy insulation of the walls on which the circulating channels are mounted. In addition, heat economy is also attributable to the fact that the heat is applied in the first instance only to the returning current of fat and there is virtually no point at which the heat can escape from the fat of the returning current except by conduction through the partition 21 to the fat which is doing the frying. Because of this fact and because of the rapid circulation of all of the fat in the system, there is a strong tendency for all of the fat to be at approximately the same identical temperature.

The rapid movement of the fat in the return pipe means also facilitates heat exchange through the wall thereof which is heated directly by the burners. It prevents the wall from getting much hotter than the fat as is the case in ordinary kettle frying and most other frying machines. This is important because particles of food dropping onto the heated surface of conventional fryers become burned thereby. Such burning is virtually impossible in my device because the heated surface is never at a much higher temperature than the fat and, moreover, it is difficult for any particles of food to reach this heated surface, inasmuch as flour and particles of batter or dough which become separated from the workpieces will fall to the bottom of the frying channel and will not ordinarily reach the return pipe means.

The reason I am able to use so much less fat than is required by other machines is because of the form and disposition of the return pipe means 24, the cross sectional capacity of which is kept at a minimum, and because of the reduction in over-all length of the machine which is made possible through the use of the weirs 75. Because of the very small surface exposed, the fat in my machine does not oxidize or become discolored and needs to be replaced only to the extent that it evaporates or is carried off by the articles cooked therein. The use of otherwise waste heat for pre-heating replacement fat in tank 33 is another measure of heat economy.

In effect, my machine is continuously operating with fresh unoxidized fat free of burned food and produces a much tastier product than is possible with a machine in which these conditions do not obtain.

I claim:

1. A frying machine comprising a frame and having side members and a heating compartment therebetween, and a circulatory system including a fat-containing frying channel mounted on the frame and having side walls between said side members and provided with a generally horizontal bottom, return pipe means communicating with said channel adjacent one end thereof and having greatly restricted cross sectional capacity as compared with the channel and extending at such restricted capacity to the opposite end of the channel, said channel bottom forming one wall of the return pipe means a circulating pump including a rotor and a pump chamber communicating with the return pipe means and with the channel, said circulating pump being adapted to establish fat circulation throughout the channel and return pipe means at a rate of flow which is rapid in the return pipe means and relatively slow in the channel, means for applying heat externally to the return pipe means along a substantial portion of the entire length thereof, the return pipe means being immediately beneath the channel and having a common wall therewith whereby excess heat not absorbed in the return pipe means is delivered through the common channel and return pipe means wall to the fat circulating therein, and a flue connection opening from said compartment for the discharge of products of combustion.

2. The device of claim 1 in further combination with a preheating fat storage tank having a wall portion connected with the flue for heat exchange to receive heat from flue gases, said tank having a valve controlled supply connection to said system.

3. The device of claim 1 in which said frying channel is provided with baffle means for controlling the movement of food with fat circulating in the channel, and means for depositing food in the fat in said channel and adjacent one end of the channel, whereby the food so deposited may be fried and concurrently advanced along the channel.

4. In a deep fat frying machine, a circulatory system comprising an open top channel for frying, return pipe means of materially restricted cross-section as compared with said channel, means for positively circulating fat in said system at relatively low speed along the channel and at relatively high speed through the return pipe means on account of the restricted cross-section of the latter, means for heating the return pipe means to maintain the temperature of the fat within the system, said return pipe means being disposed in heat blocking relation between the heating means and the channel and having a common wall with the channel along all of that portion of the channel adjacent said heating means for transfer of some of the heat through the return pipe means into said channel, the movement of fat through the return pipe means being sufficiently rapid to pass the fat therethrough without raising its temperature substantially higher than the temperature of the fat in the frying channel and thereby tending to prevent burning of the fat and delivery of excess heat thereto, the rate of flow through the channel being too low to cause circulation with the fat of crumbs of food dropping toward the bottom of the channel and the temperature of the fat in the channel being maintained below temperatures at which such food will become scorched.

5. The device of claim 4 in which the heating means is elongated to extend for a substantial portion of the length of the return pipe means and channel, whereby a substantial part of all of the fat in the return pipe means is continuously being heated in the course of its rapid flow through said return pipe means.

6. The device of claim 4 in which the frying channel and return pipe means comprise a single trough and the common wall therebetween is a substantially continuous and generally horizontal partition adjacent the bottom of the trough separating the frying channel from the return pipe means, means adjacent one end of the channel for depositing therein material to be fried and to be propelled through the channel by the circulation of fat in said system, and means adjacent the other end of the channel for raising the fried food from the fat.

7. The device of claim 4 in which the channel has a bottom which is tapered toward its center from its sides, the outward margins of the partition being immediately proximate the sides of the channel bottom whereby flow through the return pipe means below the partition is concentrated along the center of the channel bottom beneath the partition, the heating means being disposed beneath the deepest part of the bottom and intermediate the deepest part and the sides of the bottom.

References Cited in the file of this patent
UNITED STATES PATENTS

| | | |
|---|---|---|
| 1,401,945 | Morris | Dec. 27, 1921 |
| 1,440,663 | Dunn | Jan. 2, 1923 |
| 1,598,435 | Gottshalk | Aug. 31, 1926 |
| 1,992,891 | Schmidt | Feb. 26, 1935 |
| 2,207,316 | Ferry | July 9, 1940 |
| 2,360,727 | Shaw | Oct. 17, 1944 |
| 2,470,446 | Rankin | May 17, 1949 |
| 2,652,767 | Childs | Sept. 22, 1953 |
| 2,715,869 | Salvo | Aug. 23, 1955 |
| 2,726,597 | Luke | Dec. 13, 1955 |
| 2,767,095 | Smith | Oct. 16, 1956 |